(12) United States Patent
Koelsch et al.

(10) Patent No.: US 9,580,035 B2
(45) Date of Patent: Feb. 28, 2017

(54) VEHICLE SEAT BOTTOM WITH AIRBAG MODULE

(71) Applicant: FORD GLOBAL TECHNOLOGIES, LLC, Dearborn, MI (US)

(72) Inventors: Markus Koelsch, Cologne (DE); Michael Goesch, Hilden (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/993,932

(22) Filed: Jan. 12, 2016

(65) Prior Publication Data

US 2016/0214558 A1 Jul. 28, 2016

(30) Foreign Application Priority Data

Jan. 14, 2015 (DE) .................. 10 2015 200 386

(51) Int. Cl.
| | |
|---|---|
| *B60R 21/207* | (2006.01) |
| *B60N 2/70* | (2006.01) |
| *B60R 21/2342* | (2011.01) |
| *B60R 21/26* | (2011.01) |
| *B60R 21/217* | (2011.01) |
| *B60R 21/16* | (2006.01) |

(52) U.S. Cl.
CPC .......... *B60R 21/207* (2013.01); *B60N 2/7035* (2013.01); *B60R 21/2342* (2013.01); *B60R 21/2176* (2013.01); *B60R 2021/161* (2013.01); *B60R 2021/26076* (2013.01)

(58) Field of Classification Search
CPC ............. B60R 21/207; B60R 21/2342; B60R 2021/23146; B60R 2021/26076; B60N 2/7035
See application file for complete search history.

(56) References Cited

U.S. PATENT DOCUMENTS

| | | | |
|---|---|---|---|
| 5,810,389 A | * | 9/1998 | Yamaji .................. B60R 21/207 280/728.3 |
| 5,967,603 A | | 10/1999 | Genders et al. |
| 6,045,151 A | | 4/2000 | Wu |
| 6,523,237 B1 | | 2/2003 | Kopec et al. |

(Continued)

FOREIGN PATENT DOCUMENTS

| | | |
|---|---|---|
| DE | 10340508 A1 | 3/2005 |
| DE | 102009004882 A1 | 7/2010 |
| JP | 20111569097 A | 8/2011 |

OTHER PUBLICATIONS

German Patent and Trademark Office, Examination Report for the corresponding German Patent Application No. 10 2015 200 386.8 dated Jun. 22, 2015.

*Primary Examiner* — Drew Brown
(74) *Attorney, Agent, or Firm* — Frank MacKenzie; Bejin Bieneman PLC

(57) ABSTRACT

A vehicle seat has an airbag module arranged in a seat bottom cushion. The seat bottom cushion is covered by a cover and comprises at least a first, relatively softer, "comfort" foam element adjacent to the cover and a second, relatively harder or firmer, "protective" foam element. The airbag module is positioned within a cavity defined in and by the second foam element so that it is at least partially surrounded by the harder second foam to protect the airbag module from downward forces applied to the seat bottom.

12 Claims, 2 Drawing Sheets

(56) References Cited

U.S. PATENT DOCUMENTS

| | | | |
|---|---|---|---|
| 6,896,325 B2 | 5/2005 | Takedomi et al. | |
| 7,798,522 B2* | 9/2010 | Itoga | B60N 2/42718 |
| | | | 280/730.1 |
| 8,585,079 B2 | 11/2013 | Gorman et al. | |
| 9,180,837 B2* | 11/2015 | Fujiwara | B60R 21/231 |
| 2005/0140199 A1* | 6/2005 | Kang | B60N 2/7035 |
| | | | 297/452.27 |
| 2005/0173898 A1 | 8/2005 | Yoshikawa et al. | |
| 2008/0073952 A1* | 3/2008 | Tracht | B60R 21/207 |
| | | | 297/216.13 |
| 2010/0133891 A1 | 6/2010 | Onoda et al. | |
| 2010/0181796 A1* | 7/2010 | Galbreath | B60N 2/72 |
| | | | 296/63 |
| 2012/0068442 A1* | 3/2012 | Wagner | B60R 21/207 |
| | | | 280/730.2 |
| 2013/0049417 A1 | 2/2013 | Bchnock et al. | |
| 2013/0147167 A1* | 6/2013 | Kwon | B60R 21/233 |
| | | | 280/730.2 |
| 2013/0200598 A1* | 8/2013 | Honda | B60R 21/20 |
| | | | 280/730.2 |
| 2013/0257027 A1* | 10/2013 | Kwon | B60R 21/233 |
| | | | 280/743.2 |
| 2014/0049028 A1* | 2/2014 | Schenten | B60R 21/231 |
| | | | 280/730.1 |
| 2014/0117648 A1* | 5/2014 | Tracht | B60R 21/207 |
| | | | 280/728.2 |
| 2014/0138939 A1* | 5/2014 | Scott | B60R 21/207 |
| | | | 280/736 |
| 2015/0076801 A1* | 3/2015 | Fujiwara | B60R 21/231 |
| | | | 280/729 |
| 2015/0336528 A1* | 11/2015 | Tanabe | B60R 21/207 |
| | | | 280/728.2 |

* cited by examiner

VEHICLE SEAT BOTTOM WITH AIRBAG MODULE

CROSS-REFERENCE TO RELATED APPLICATIONS

This application claims foreign priority benefits under 35 U.S.C. §119(a)-(d) to DE 10 2015 200 386.8 filed Jan. 14, 2015, which is hereby incorporated by reference in its entirety.

TECHNICAL FIELD

The present invention relates to a vehicle seat having an occupant protection airbag module located within the cushion of the seat bottom cushion.

BACKGROUND

The airbag modules which are generally known from the prior art and which have an inflatable air sack and an inflator are intended to protect the occupants of a vehicle from injury in the event of an impact or rollover of a vehicle. In the course of continuing development of safety devices in motor vehicles, more and more vehicles feature a so-called side airbag which protects the vehicle occupant sitting in a vehicle seat laterally from contact with the side structures of the vehicle, for example, door and/or pillar structures. In this instance, it is important that the air sack is deployed correctly and in a predetermined direction since the space between the side structures and the vehicle seat/occupant is small.

Documents U.S. Pat. No. 6,045,151A, U.S. Pat. No. 6,523,273B1 and DE 103 40 508 A1 disclose, for example, airbag modules which are received in a backrest of a vehicle seat.

In addition to accommodating the airbag module in the backrest of a vehicle seat, the integration of airbag modules in seat bottom portions of vehicle seats is also known, as disclosed, for example, in the printed publications U.S. Pat. No. 5,967,703A, JP 2011-156907 A and U.S. Pat. No. 6,896,325B2. In this instance, the airbag modules may, on the one hand, act as side airbags or also serve to tilt the seat face in the event of an accident in order to improve the seating position of the vehicle occupant sitting in the vehicle seat.

Airbag modules accommodated in seat portions of vehicle seats are generally subjected to greater loads during their service-life, for example, as a result of ordinarily occurring entry and exit operations of occupants sitting in the vehicle seat, than airbag modules accommodated in backrests. It is also possible for a direct high loading of the seat portion, for example, as a result of heavy bags, crates, cases and the like, which are placed on the seat portion as well as an indirect high loading of the rear side of a backrest of the vehicle seat which is folded forward, to contribute to a significant loading of the airbag module which is received in the seat portion.

SUMMARY

According to the present disclosure, a vehicle seat comprises an airbag module which is arranged in a seat bottom portion and which comprises an inflatable air sack, also referred to herein as an airbag, and an inflator for deploying the air sack, for example, a gas generator, and a cushion which forms the seat portion and which is covered by a cover. The cushion comprises at least a first foam, also referred to herein as a comfort foam, which is adjacent to the cover and on which a vehicle occupant sitting on the seat portion is seated, and a second foam which at least partially surrounds the airbag module. The second foam, also referred to herein as hard foam, has a greater hardness than the first foam or comfort foam.

The comfort foam is selected and designed primarily to convey a pleasant, comfortable, and safe seating sensation to the vehicle occupant. The hard foam serves to protect the airbag module substantially from influences of forces acting downwardly on the airbag module from the top/outer side of the seat cushion, as may occur, for example, from the use of the vehicle seat described in the introduction. This is achieved primarily by the designed hardness of the particular material used to form the hard foam which is in any case greater than the hardness of the material selected as the comfort foam. Accordingly, the hard foam is significantly more dimensionally stable than the comfort foam so that it absorbs the forces acting on it from the outer side and does not transmit them to the airbag module. The hard foam protects the airbag module against forces which act from the top/outer side and which, when the vehicle seat is used, are introduced by an object which is placed on the seat portion into the comfort foam and transmitted thereby.

According to an advantageous embodiment disclosed herein, the airbag module is a soft-pack airbag module, that is to say, an airbag module which is surrounded by a soft cover rather than a more rigid housing. Advantageously, it is consequently possible to dispense with a rigid metal or plastics material housing. On the one hand, the structural space required for the airbag module can thereby be reduced and, on the other hand, the weight of the vehicle seat can thereby be reduced by a hard foam being selected with a lower weight than the module housing which is conventionally used.

Another advantageous embodiment disclosed herein makes provision for the airbag module to be arranged in the seat portion at an outer side of the seat portion. In this manner, the assembly of the vehicle seat can be simplified before the seat is assembled in the vehicle by the airbag module being accessible from the outer side of the seat and being able to be assembled in an unimpeded manner in the seat portion. Furthermore, the airbag module, when the vehicle seat is in a state fitted in the vehicle, is advantageously arranged between the side structures of the vehicle, for example, a door and/or pillar covering, and the seat portion so that a rapid and safe deployment of the airbag in the event of an accident can be carried out in the intermediate space between the side structures and the vehicle seat.

According to yet another advantageous embodiment disclosed herein, the airbag module is received in a (non-resilient) chute channel which is provided in the cushion and which is also referred to as a force concentrator, in order to guide the deploying air sack with respect to a tear seam which is provided in the cover. Via the chute channel or force concentrator, the force released by the deploying air sack in an airbag chute is directed to the tear seam in the cover so that it tears open in a reliable manner in an airbag chute and opens up the path from the seat portion for the air sack. The assembly at the outer side simplifies the use of a force concentrator.

According to another preferred embodiment disclosed herein, the vehicle seat is a rear seat of the vehicle.

Other features and advantages of the invention will be appreciated from the following description of an embodiment, which is not intended to be understood to be limiting, of the invention which is explained in greater detail below with reference to the drawings. In the schematic drawings:

DETAILED DESCRIPTION

Figure 1:
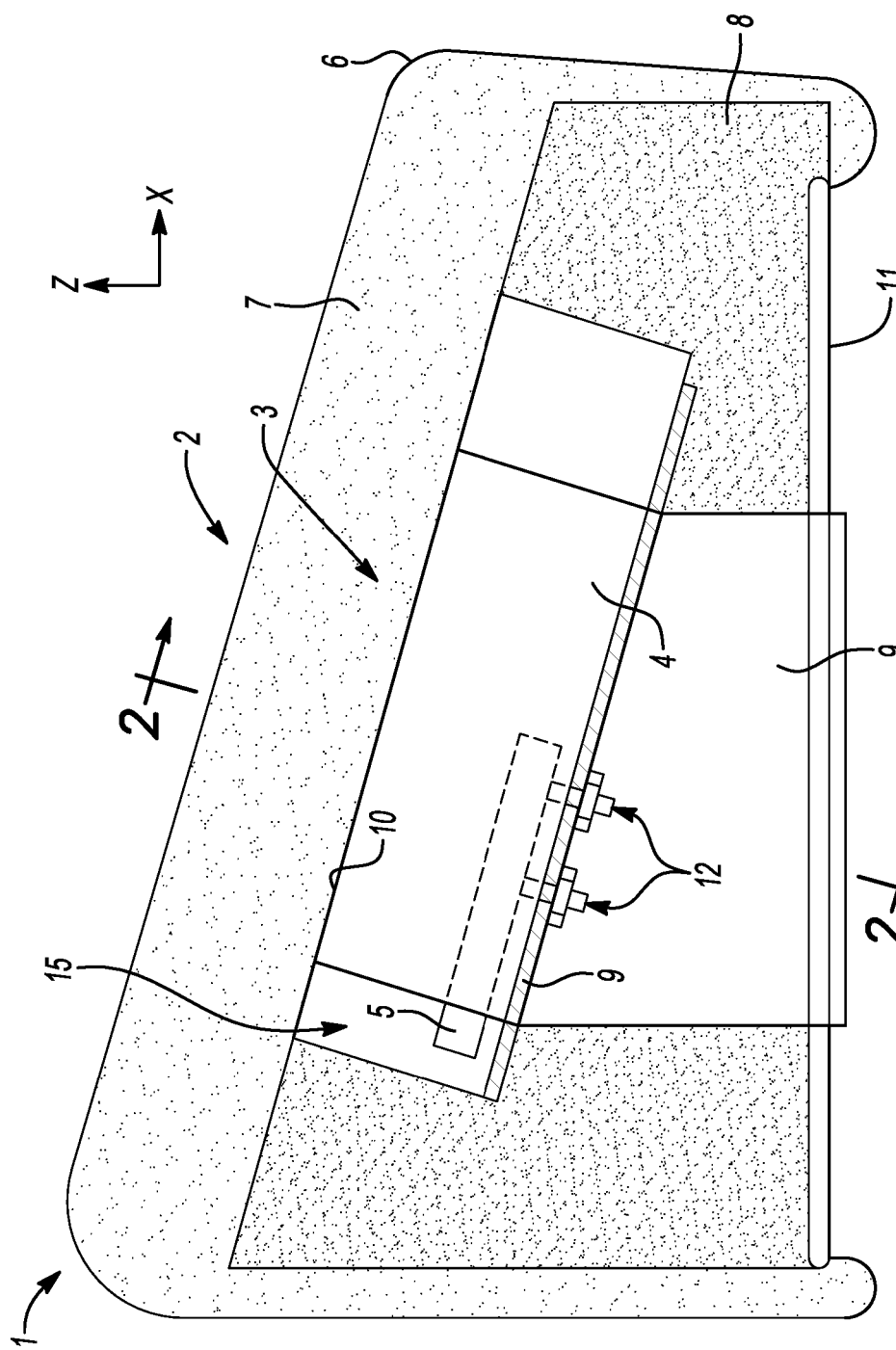
FIG. 1 is a side view of an embodiment of a vehicle seat according to the invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the various Figures, components which are equivalent in terms of their function are always given the same reference numerals so that they are generally also only described once.

FIG. 1 is a longitudinal cross-section (side view) of a vehicle seat 1 according to an embodiment of the invention when viewed from an outer or outboard (when installed in a vehicle) side of the seat 1. As can be seen in FIG. 1, only the seat portion 2 of the vehicle seat 1 is shown. However, it is intended to be understood that a backrest of the vehicle seat 1 generally adjoins the rear end portion of the seat portion 2 as illustrated in the right-hand half of the image. The left-hand half of the image of FIG. 1 shows the front portion of the seat portion 2.

FIG. 1 further shows an airbag module 3 which is received or arranged in the seat portion 2. The airbag module 3 comprises, in the embodiment of the vehicle seat 1 illustrated in FIG. 1, an inflatable air sack 4 (airbag) and an inflator 5 (gas generator) for inflating the air sack 4 in an airbag chute. The air sack 4 is illustrated in a folded-together (stowed) state in FIG. 1.

In a particularly advantageous manner, the airbag module 3 illustrated in FIG. 1 is of the type commonly referred to as a "soft-pack" module, in that it is surrounded only by a soft cover. It therefore requires no rigid metal or plastics material housing.

It is further illustrated in FIG. 1 that the seat portion 2 is formed from a cushion which is covered by a cover 6. In the vehicle seat 2 illustrated, the cushion comprises an element 7 made of a first, relatively soft resilient material (comfort foam) and an element 8 made of a second, relatively hard resilient material (hard foam). The first and second elements 7, 8 may be made from materials selected from foams of the general type commonly used in vehicle seat cushions, as is well known in the art. Accordingly, the resilient elements 7, 8 will hereafter be referred to as soft foam and hard foam respectively. The term "foam," however, is not intended to limit the types of materials used, as any material having the appropriate mechanical properties may be used.

The first or soft foam element 7 is immediately beneath and adjacent to the cover 6 in the vehicle seat 1 illustrated, whereas the second or hard foam element 8 is disposed beneath and underlies the soft foam element inside the seat portion 2. A hollow cavity or recess 15 is defined in and by the hard foam element 8 and the airbag module 8 is located substantially completely inside the cavity so that the hard foam element 8 at least partially surrounds the airbag module 3. Advantageously, the hardness of the second foam element 8 is significantly greater than the hardness of the first foam element 7 so that the more dimensionally stable second foam element 8 protects the airbag module 3 from external influences of forces. The first/soft foam element 7 primarily provides a pleasant, comfortable and secure seating sensation for the vehicle occupant (not illustrated) sitting therein.

FIG. 1 shows that the hard foam 8 in the embodiment of the vehicle seat 1 illustrated surrounds the airbag module 3 at a front side (left half of the image) and at a rear side (right half of the image) of the airbag module 3 and has an uppermost surface height (relative to the vertical or Z-axis of the vehicle) which is substantially even with the height of an upper side 10 of the airbag module 3. In this manner, the airbag module 3 is received in the recess or cavity 15 formed in the hard foam and is therefore protected in an adequate manner from external influences of forces.

As can further be seen in FIG. 1, the airbag module 3 is securely connected to a structural portion 11 of the vehicle seat 1, for example, a seat frame, by means of a carrier 9.

Figure 2:
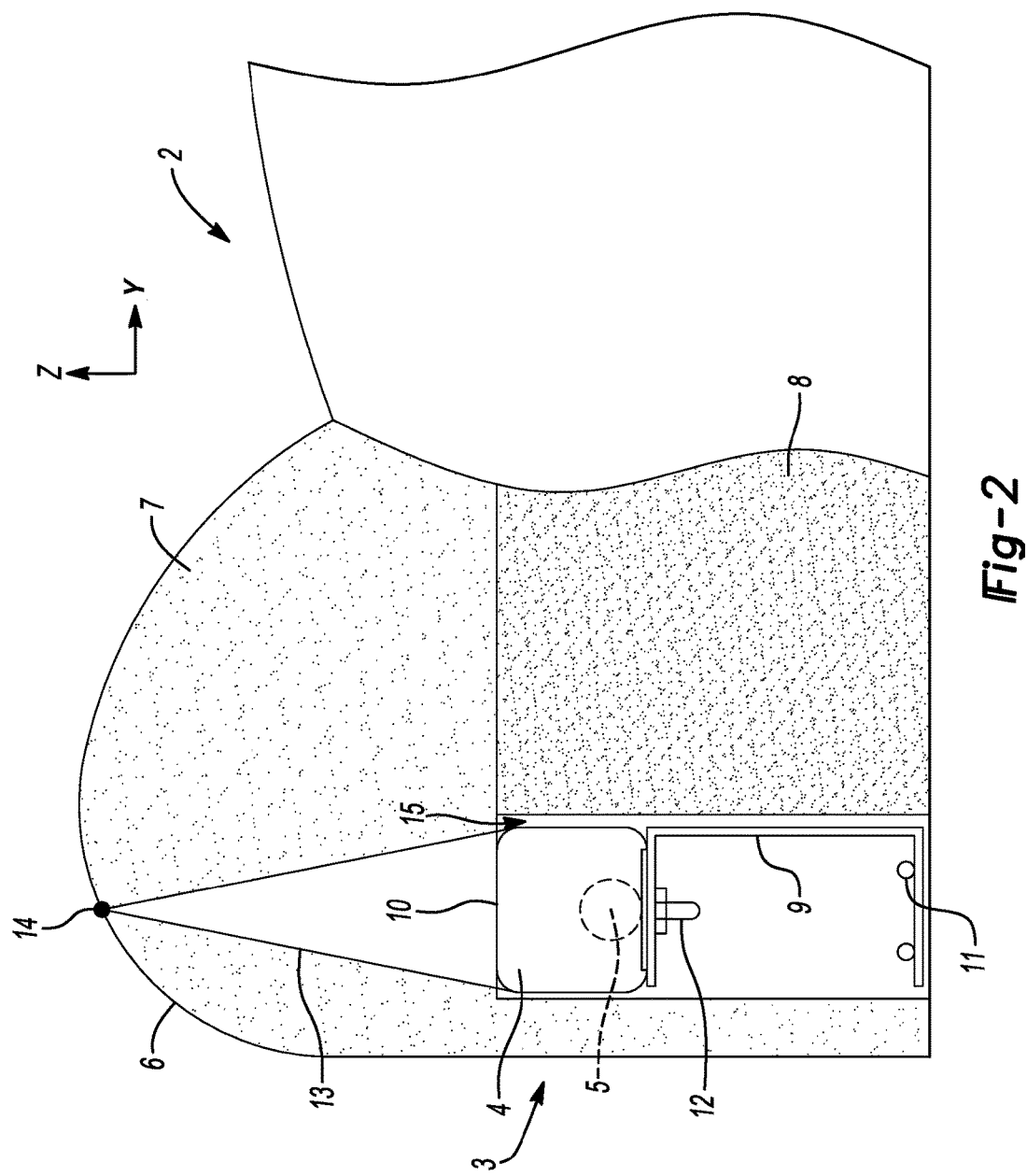
FIG. 2 is a sectioned view of the vehicle seat from FIG. 1 along line A-A.

FIG. 2 is a sectioned view of the vehicle seat 1 from FIG. 1 along the line A-A. Accordingly, FIG. 2 is a view from the rear and looking forward at the vehicle seat 1 from FIG. 1.

FIG. 2 shows that the hard foam element 8 adjoins an inner side of the airbag module 3 and extends upwardly at least as far as the upper side 10 of the airbag module 3. Consequently, in the illustrated embodiment of the vehicle seat 1, the hard foam element 8 surrounds the airbag module 1 at the front, inner and rear side thereof in order to effectively protect the airbag module 3 from external influences of forces. Airbag module 3 thus is received in the cavity 15 formed in the hard foam element 8.

It can further be seen in FIG. 2 that the carrier 9 in the illustrated embodiment of the vehicle seat 1 has a substantially U-shaped cross-sectional profile. The open side of the U-shaped carrier 9 is advantageously directed to the outer side of the vehicle seat 1 (left-hand half of the image) in order to thus be able to ensure unimpeded access to securing means 12 for assembly of the airbag module 3 on the carrier 9.

A non-resilient chute channel 13 in the cushion, in particular in the comfort foam element 7, can further be seen in FIG. 2. The chute channel 13 serves to guide the air sack 4 which is deployed in an airbag chute with respect to a tear seam 14 which is provided in the cover 6 and to ensure rapid and effective tearing open of the tear seam 14 in an airbag chute.

As can be seen in FIG. 2, in the vehicle seat 1 illustrated the airbag module 3 is arranged at the outer side (left-hand half of the image) of the seat portion 2. The airbag module 3 is in this instance a side airbag module whose air sack 4 is deployed in an airbag chute between lateral structural portions (not illustrated) of the vehicle, for example, an internal trim of a door or a B or C pillar of the vehicle, and the outer or outboard side (relative to the vehicle as a whole) of the vehicle seat 1 in order to protect the vehicle occupant seated in the vehicle seat 1 from contact with these structural components of the vehicle in the event of an impact or a rollover of the vehicle.

The vehicle seat according to the invention has been explained in greater detail with reference to an embodiment illustrated in the Figures. However, the vehicle seat is not limited to the embodiment described herein, but instead also includes other embodiments which function in the same manner. In particular, the airbag module is not limited to a function as a side airbag module. Other positions of the airbag module in the seat portion are also conceivable, which positions are not provided on the outer side of the seat portion.

In a preferred embodiment, the vehicle seat according to the invention is used as a rear seat in a motor vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat bottom comprising:
a first resilient material adjacent a seating surface of the seat bottom;
a second resilient material underlying and having an upper surface adjacent to the first resilient material, having a greater hardness than the first resilient material;
a c-shaped cavity formed in the second resilient material, the cavity sized to accommodate and surround an airbag module at a front, an inner, and a rear side of the airbag module;
the first resilient material on an outer side of the airbag module; and
the airbag module disposed in the cavity and substantially even with or below the upper surface of the second resilient material.

2. The vehicle seat bottom of claim 1, wherein the airbag module is a soft-pack module having a soft cover.

3. The vehicle seat bottom of claim 1, further comprising a chute channel formed in the first resilient material above the airbag module and extending toward a tear seam in a cover over the first resilient material to guide an air sack during deployment.

4. The vehicle seat bottom of claim 1, further comprising a carrier to which the airbag module is secured to mount the airbag module to a seat frame.

5. A vehicle seat bottom comprising:
a first foam element adjacent a seating surface of the seat bottom;
a second foam element underlying and having an upper surface adjacent to the first foam element, having a greater hardness than the first foam element;
a c-shaped cavity formed in the second resilient material, the cavity sized to accommodate and surround an airbag module at a front, an inner, and a rear side of the airbag module;
the first resilient material on an outer side of the airbag module; and
the airbag module disposed in the cavity and lower than or even with the upper surface.

6. The vehicle seat bottom of claim 5, wherein the airbag module is a soft-pack module having a soft cover.

7. The vehicle seat bottom of claim 5, further comprising a chute channel formed in the first foam element above the airbag module and extending toward a tear seam in a cover over the first foam element to guide an air sack during deployment.

8. The vehicle seat bottom of claim 5, further comprising a carrier to which the airbag module is secured to mount the airbag module to a seat frame.

9. A vehicle seat bottom comprising:
a seat cushion comprising a first foam element adjacent an upper surface of the cushion, and a second foam element underlying the first foam element and having a greater hardness than the first foam element;
a c-shaped cavity formed in the second resilient material, the cavity sized to accommodate and surround an airbag module at a front, an inner, and a rear side of the airbag module;
the first resilient material on an outer side of the airbag module; and
an airbag module disposed in the cavity.

10. The vehicle seat bottom of claim 9, wherein the airbag module is a soft-pack module having a soft cover.

11. The vehicle seat bottom of claim 9, further comprising a chute channel formed in the first foam element above the airbag module and extending toward a tear seam in a cover over the first foam element to guide an air sack during deployment.

12. The vehicle seat bottom of claim 9, further comprising a carrier to which the airbag module is secured to mount the airbag module to a seat frame.

* * * * *